United States Patent [19]
Weaver

[11] Patent Number: 5,941,662
[45] Date of Patent: Aug. 24, 1999

[54] METHOD AND APPARATUS FOR PROTECTING A FLANGE

[75] Inventor: David J. Weaver, Houston, Tex.

[73] Assignee: Riserclad International International, Inc., Houston, Tex.

[21] Appl. No.: 08/893,726

[22] Filed: Jul. 11, 1997

[51] Int. Cl.[6] .................................................. E02D 5/60
[52] U.S. Cl. ........................................ 405/211.1; 405/216
[58] Field of Search ................................ 405/211, 211.1, 405/216

[56] References Cited

U.S. PATENT DOCUMENTS

| | | | |
|---|---|---|---|
| 3,890,795 | 6/1975 | Maurer | 405/216 |
| 3,939,665 | 2/1976 | Gosse et al. | 405/216 |
| 4,019,301 | 4/1977 | Fox | 52/725 |
| 4,023,374 | 5/1977 | Colbert et al. | 405/216 |
| 4,081,941 | 4/1978 | Van Audall | 52/726 |
| 4,439,070 | 3/1984 | Dimmick | 405/216 |
| 4,543,764 | 10/1985 | Kozikowski | 52/746 |
| 4,818,148 | 4/1989 | Takeda | 405/234 |
| 4,892,410 | 1/1990 | Snow | 366/2 |
| 4,892,601 | 1/1990 | Norwood | 156/94 |
| 4,993,876 | 2/1991 | Snow et al. | 405/216 |
| 5,049,005 | 9/1991 | Lazare et al. | 405/216 |
| 5,226,751 | 7/1993 | Doleshal | 405/211.1 |
| 5,326,410 | 7/1994 | Boyles | 156/71 |
| 5,435,667 | 7/1995 | Strange | 405/216 |
| 5,586,838 | 12/1996 | Walsh | 405/216 |
| 5,591,265 | 1/1997 | Tusch | 118/404 |

*Primary Examiner*—Tamara L. Graysay
*Assistant Examiner*—Tara L. Mayo
*Attorney, Agent, or Firm*—Arnold, White & Durkee

[57] ABSTRACT

Flanges are often subject to corrosive marine environments and/or fire-prone environments when they are employed in applications such as offshore drilling and production platforms, or other marine applications. An apparatus and method to protect the flange from such corrosive environments and fire has been discovered. The apparatus is removable and reusable which allows the flange to be inspected and repaired when necessary.

21 Claims, 4 Drawing Sheets

METHOD AND APPARATUS FOR PROTECTING A FLANGE

FIELD OF THE INVENTION

The instant invention relates to a method and apparatus for protecting a flange. More particularly, the invention relates to a method and apparatus for protecting a flange from corrosion or fire in the splash zone of a marine environment.

BACKGROUND OF THE INVENTION

Flanges, i.e. ribs or rims extending from a pipe, are often used when connecting two pipes together because of the ability to disassemble the pipes when necessary. The flanges may be part of the pipe itself, such as a flanged-end pipe, or may be connected to the end of the pipe via a variety of means. Flanges which connect to the end of the pipe include, for example, screw-on flanges, slip-on flanges, socket-weld flanges, lap-joint flanges, welding neck flanges, and blind flanges. These flanges are illustrated in, for example, *Perry's Chemical Engineers' Handbook*, Sixth Edition, McGraw Hill Book Company, 1984, p. 6–46, which is incorporated by reference. The flanges often have a gasket between them which, unfortunately, may be flammable and could result in a leak in the event of a fire. The flanges are bolted together. Typical gaskets and bolting means are illustrated in, for example, *Perry's Chemical Engineers' Handbook*, Sixth Edition, McGraw Hill Book Company, 1984, pp. 6–46 through 6–50, which is incorporated by reference.

Often pipes connected by flanges are to be utilized in applications which require that the pipes and flanges be subjected to an external environment which is corrosive and/or subject to fire. An example of such is offshore drilling and production platforms, or other marine structures, wherein the pipes and flanges are subjected to the corrosive salt water of the ocean and possible fires due to the flammability of the produced oil and gas. While methods and apparatuses have been developed which are used to protect the pipes from the corrosive environment and fire, the methods and apparatuses are generally not effective when used for a flange. Methods and apparatuses to protect pipes include those of U.S. Pat. Nos. 5,087,154; 5,591,265; and 5,226,751.

U.S. Pat. No. 5,087,154 relates to a protective coating which has two uninterrupted and encapsulating and superposed layers of a marine resistant epoxy composition and a thin layer of reinforcing composition between the layers. Correspondingly, U.S. Pat. No. 5,591,265 relates to a protective coating which has a formwork around a tube to be protected, an annular space between the tube and formwork, a means to apply a curable resin to the annular space, a seal means, and a support ring secured to the tube. Unfortunately, the protective coatings taught in these two patents are adapted especially for pipes and if used on a flange would be difficult to secure around the flange and completely encompass the flange due to the flange's shape. Therefore, the flange would not be fully protected in many instances. In addition, the protective coatings of the two patents are not adapted for removal and replacement. Therefore, if inspection, repair, or replacement of the flange becomes necessary after the protective coating is applied, then the protective coating would have to be removed at considerable cost or the entire flange would have to be cut from the pipe.

U.S. Pat. No. 5,226,751 relates to a process for creating a controlled environment about a submerged pile by placing a jacket around the pile and then injecting air and a preheated gas into the jacket to dry the pile. After the pile is dry, the jacket is filled with a firm resilient non-corroding compound such as an expanding closed cell foam formed from liquid chemicals or epoxy resins. Unfortunately, if this process was employed on piling containing a flange, then the jacket would leave a very large annular space around the pipe where the flange is located. This would necessitate using a large amount of the very expensive filler. In addition, if the flange needed to be inspected, then it would require removing the protective covering which covers the pipe, as well as, the flange.

Another method which is often employed to protect flanges is that of cathodic protection. Cathodic protection, as described in, for example, *Encyclopedia of Science and Technology*, Vol. 4, pp. 440–445, McGraw-Hill, 1992, generally involves applying a cathodic potential, or current, to the flange. The cathodic potential prevents the flange from undergoing an anodic reaction, $M \rightarrow M^{n+} + ne^-$, which causes corrosion. This is often achieved by applying a cathodic current through an auxiliary electrode (impressed current) or by coupling the metal to be protected with a metal having a more negative open circuit potential (sacrificial anode). Unfortunately, such cathodic protection is often uneconomical. Additionally, cathodic protection is not particularly effective for flanges which are subject to both wet and dry conditions, such as flanges in a splash zone of an offshore drilling and production platforms, or other marine structures.

It would be desirable if an alternate method and apparatus suitable for protecting flanges from corrosion and/or fire could be developed. It would be beneficial if such an apparatus was adapted to be removed so that the flange could be inspected and repaired when necessary. It would be advantageous if the apparatus could be reused after removal from the flange. It would further be desirable if such flange protection could be accomplished in an environment which is subject to both wet and dry conditions, impact, abrasion, or ultraviolet light.

SUMMARY OF THE INVENTION

An apparatus and method have been discovered which protects flanges from corrosion and/or fire. The apparatus comprises a corrosion-resistalnt housing which is adapted to encapsulate a flange to be protected. The housing comprises a first section and a second section which are attached to define a substantially air-tight annular space. A first port is located on the housing and is adapted for the injection of a corrosion-inhibiting substance into the annular space. A second port is located on the housing and adapted for the expulsion of fluids which are present in the annular space prior to injection of corrosion-inhibiting substance. Advantageously, the flange protection apparatus may be removed and reused. In addition, the flange protection device may be particularly useful in corrosive, wet-dry, and fire-prone environments.

DETAILED DESCRIPTION OF THE INVENTION

The instant invention is particularly useful for protecting flanges in a corrosive environment. As used herein, "corrosive environment" means any environment which reacts with the flange to electrochemically degrade the flange. The corrosion reaction is often of the form $M \rightarrow M^{n+} + ne^{-}$, wherein M is the metal from which the flange is made, $M^{n+}$ is an oxidized form of the metal after corrosion, e is an electron, and n is the number of electrons. Corrosive environments often include water or air which contains NaCl, high temperatures, alternate wet and dry conditions, acidity, or basicity. Among applications for which the instant invention is particularly useful are offshore drilling and production platforms, or other marine structures, which due to their location in the splash zone or tidal zone, subject a flange to a corrosive environment. In addition, the flange protection device is useful for applications which may subject the flange to a risk of fire.

The apparatus of the instant invention employs a housing which is adapted to encapsulate a flange. The particular material of which the housing is comprised is not particularly important so long as the material is corrosion-resistant, i.e., the material does not electrochemically degrade substantially when subjected to a corrosive environment for extended periods of time. In addition, the material is preferably fire-resistant if the device is to be utilized for an application which may subject the flange to fire. It is also preferred that the material be impact and abrasion-resistant if it is to be subjected to such forces as waves, tides, or floating debris. Particularly preferred materials for the housing are steel, thermoplastics, thermoset composites, or mixtures thereof. A particularly preferred material is a thermoset composite due to its excellent ability to resist degradation by chemicals and ultraviolet light.

Figure 3:
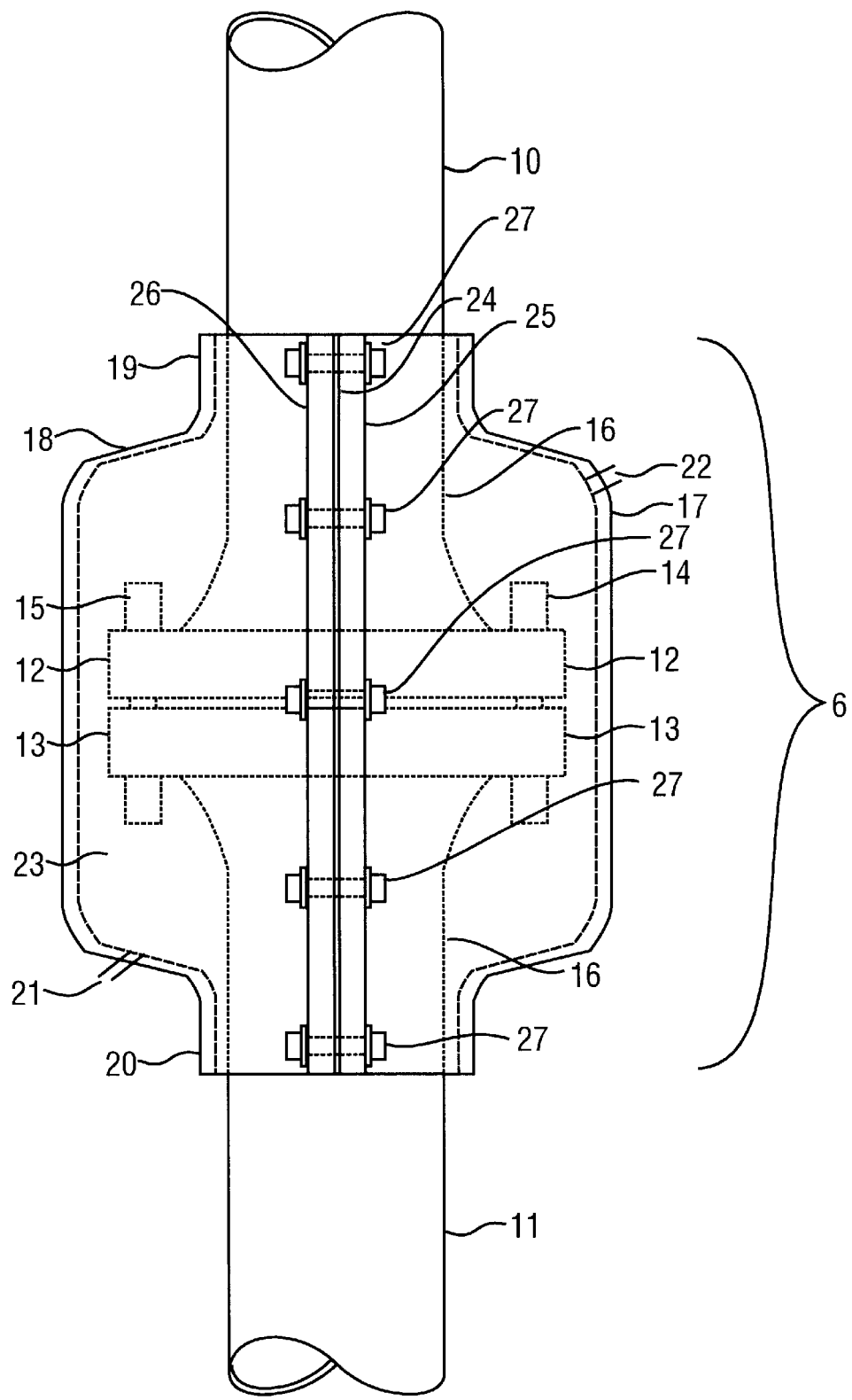
FIG. 3 is a cross-section of a flange protection device of the instant invention in conjunction with a pipe and flange.
Figure 4:
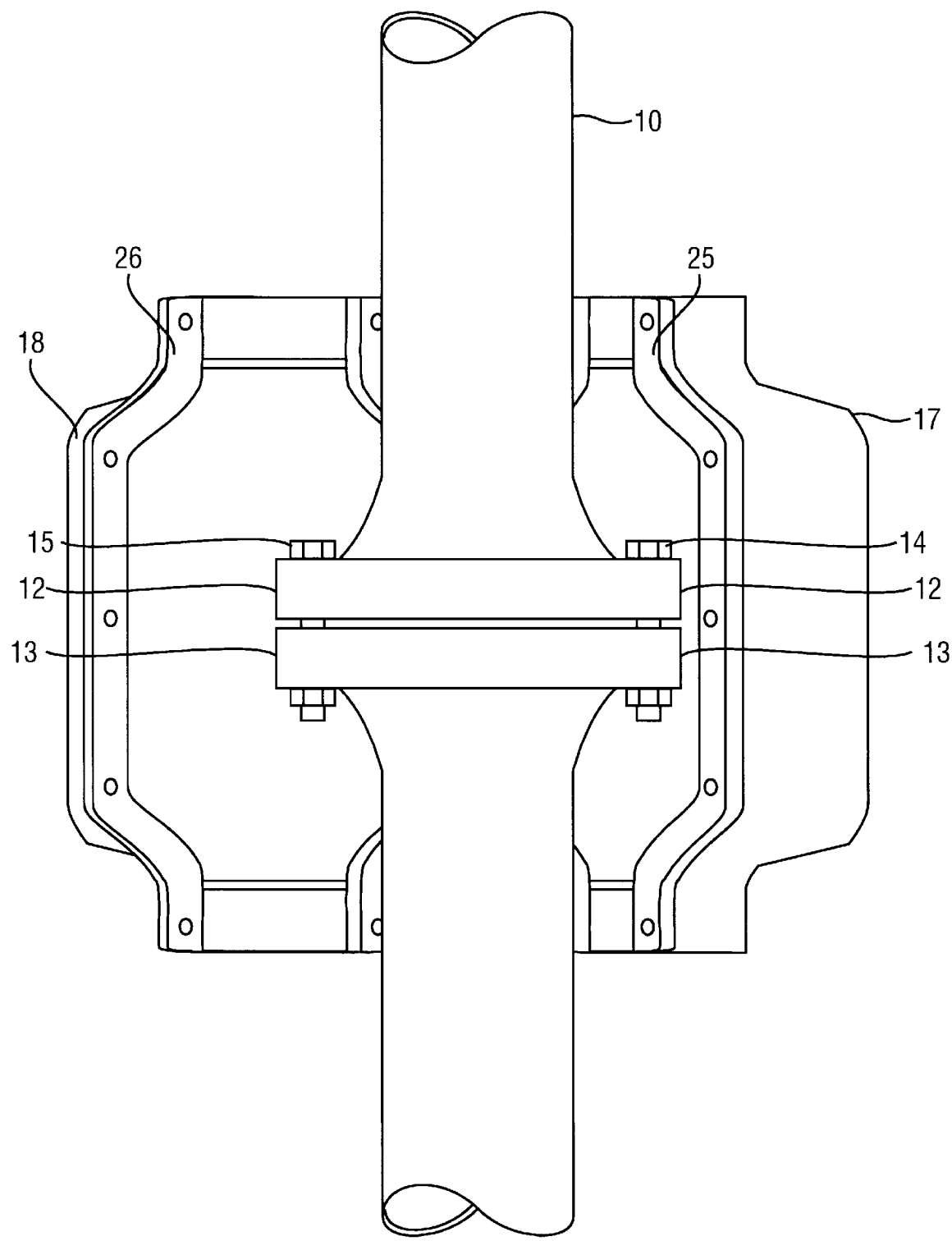
FIG. 4 is an open view of a flange protection device of the instant invention in conjunction with a pipe and flange.
Figure 5:
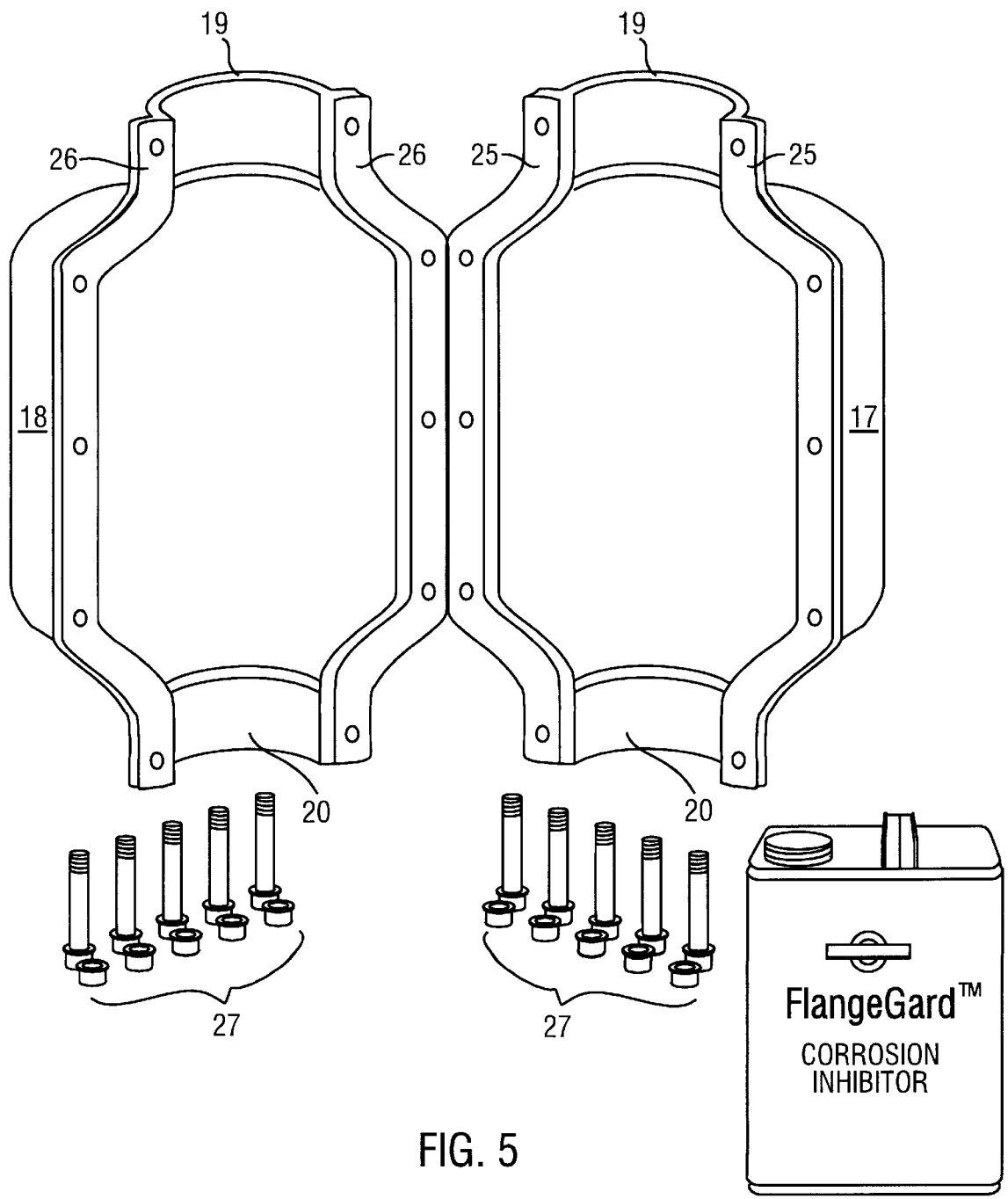
FIG. 5 is an open view of a flange protection device of the instant invention, its hardware, and a corrosion inhibiting liquid.

The shape of the housing is not particularly critical so long as an annular space exists between the housing and the flange. Since the annular space will be injected with a corrosion-inhibiting substance, as described below, it is usually advantageous to select a shape for the housing which will minimize the volume of annular space. In this manner, the amount of liquid which is necessary to fill the annular space will also be minimized. A particularly preferable shape, therefore, is hemicylindrical as shown in FIG. 3.

Another consideration in regard to shape is the type of material to be utilized. As one skilled in the art will appreciate some materials are more difficult to mold into certain shapes, or when molded into a certain shape are less strong. For example, many composite materials are difficult to mold into shapes having sharp edges or contours, for example, 90° angles, while maintaining the structural integrity of the shape. For this reason, it may be desirable to avoid such shapes having 90° angles and employ shapes which tend to be more circular or cylindrical when utilizing composite materials.

The housing is comprised of two or more sections in order that the housing may be easily removed when inspection or repair of the flange is necessary. The sections are attached such that the annular space is substantially airtight and watertight. In this manner, no corrosive elements may enter the annular space and attack the flange. The means of attachment may be any means which facilitates a substantially airtight and watertight fit between or among the sections. While the actual number of sections may depend upon the size and shape of the flange to be protected, usually two mirror-image sections are most practical in order to facilitate the attachment, i.e., typically it is less burdensome to attach two sections as opposed to three or more.

As stated above, the attaching means may be any means which facilitates a substantially airtight and watertight fit between or among the sections. It is also preferable that the attaching means be such that the sections may be detached relatively easily when inspection or repair of the flange becomes necessary. The actual attaching means employed is often dependent upon the type of material used for the housing, as well as, the number of sections in the housing. For instance, if the material is fairly rigid, such as steel, then a bolt and nut often adequately serve to attach the sections. However, if the material is pliable, for example, a thermoplastic such as rubber, then often a clamping means is most desirable to press the sections together. In some instances, a glue may even be utilized so long as the glue provides an airtight and watertight seal between or among the sections and yet still allows one to detach the sections relatively easily if inspection or repair of the flange is necessary.

While it is usually not critical to the flange protection device if the sections of the housing are adequately attached, in some instances a sealing means between or among the sections of the housing may be useful. Such a sealing means is most often necessary when the housing is comprised of an inflexible material such as steel because an incomplete seal between or among the sections may exist due to the sections not fitting perfectly together. On the other hand, if the housing is comprised of a thermoplastic such as rubber, then often no seal is necessary.

The sealing means should be corrosion-resistant and act to prevent leakage of air or water into the annular space. Along the same lines, the sealing means acts to prevent leakage of a corrosion-inhibiting substance from the annular space to the external environment. Such a sealing means may be simply a piece of rubber which contacts the lateral surface of a housing section at the point where the section is attached to another section. Such a means may be referred to simply as a seal or a gasket.

A first port is located on the housing and is adapted to allow a corrosion-inhibiting substance to be injected into the annular space. A second port is also located on the housing and adapted for expelling any fluids, whether they be liquids or gases, which are present in the annular space prior to the injection of corrosion-inhibiting substance. The fluids which are present prior to injection often include seawater, freshwater, air, or combinations thereof when the flange is being utilized in the splash zone of a marine environment. The ports are preferably capable of being opened or closed by, for example, a valve.

The first or second port is also useful for removing, for example draining, the corrosion-inhibiting substance when repair or inspection of the flange is necessary. In addition, either port or an additional port may be employed to reduce the pressure within the flange protection device in the event of a leak from the flange. If leaking from the flange is likely then it may be desirable to include a pressure sensing device within the flange protection device. In this manner, if a leak does occur, the port may be opened to prevent the flange protection device from bursting.

The first and second port may be located anywhere on the housing so long as the existing fluids in the annular space are ejected upon the introduction of corrosion-inhibiting substance. Generally, it is most convenient and practical to orient the two ports such that gravity may be used advantageously. For example, when the first port is located below the second port, then the introduction of corrosion-inhibiting substance pushes the existing fluids upward and out of the second port into the external environment. When substantially all of the annular space is filled with the corrosion-inhibiting substance and, correspondingly, substantially all of the existing fluids have been expelled, then the ports are closed and the flange is protected.

The corrosion-inhibiting substance for use in the annular space of the present invention may be any substance which either retards, slows, or reverses electrochemical degradation of the flange. Likewise, a corrosion-inhibiting substance may break down the corrosion product such that the flange is cleaned. The type of corrosion-inhibiting substance employed may be a solid liquid, gas, foam, gel or any other form which may be injected into the annular space. It is generally preferable that the substance be a liquid at 25° C. such that the substance may be easily injected into the annular space, drained and replaced easily if such becomes necessary. It is also generally preferable that such a liquid does not freeze and expand at temperatures to which the flange protection device will be subjected. In this manner, the housing of the flange protection device will not be subjected to stress due to the expansion of the substance within the annular space.

The corrosion-inhibiting substance may vary depending upon the amount of time the flange is to be protected, the susceptibility of the particular flange to corrosion, and the amount of corrosion which may have already occurred. One skilled in the art will readily recognize that if a flange is to be protected for a period of, for example, 10 years then a different corrosion-inhibiting substance may be chosen than if the flange is only in need of protection for a period of, for example, 1 year. Likewise, one skilled in the art will readily recognize that if a particular flange is very susceptible to corrosion then a stronger corrosion inhibitor may be necessary and if substantial corrosion of the flange has already occurred, then an inhibitor which breaks down the corrosion product and cleans the flange may be necessary.

Corrosion-inhibiting substances useful in the invention may be prepared individually or may be obtained commercially. Among corrosion-inhibiting substances which are useful in the instant invention include citric acid-type metal conditioners and rust removers. These corrosion-inhibiting liquids typically comprise citric acid, esters, or mixtures thereof. Other corrosion-inhibiting liquids include Bioguard™ available from Royal Lubricants Company, Inc., Rusteco R-200-3™ available from TMT Services Corp., and other commercially available corrosion inhibitors or mixtures thereof. Alternatively, two or more substances which do not individually exhibit corrosion-inhibition properties could be injected into the annular space and react to form a corrosion-inhibiting substance within the annular space.

Figure 1:
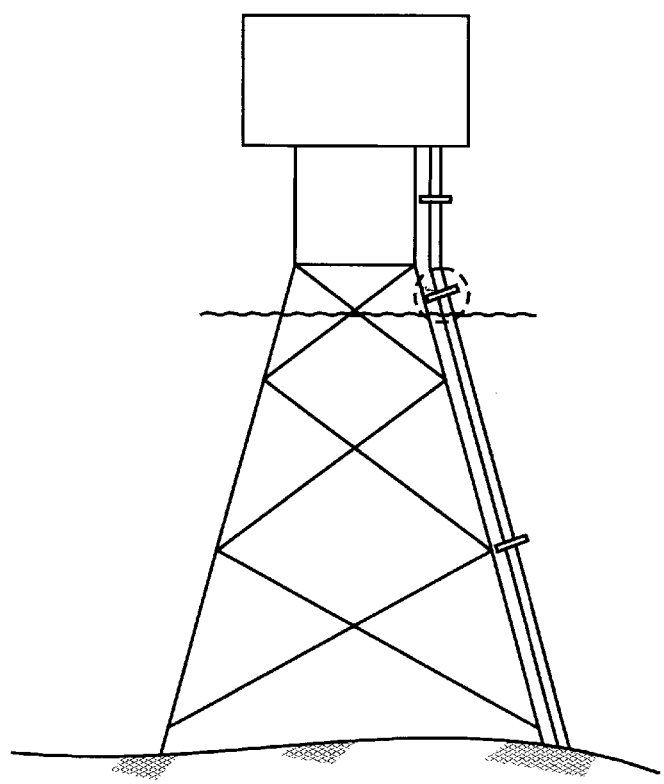
FIG. 1 is a production platform showing a flange located in the splash zone in a marine environment.
Figure 2:
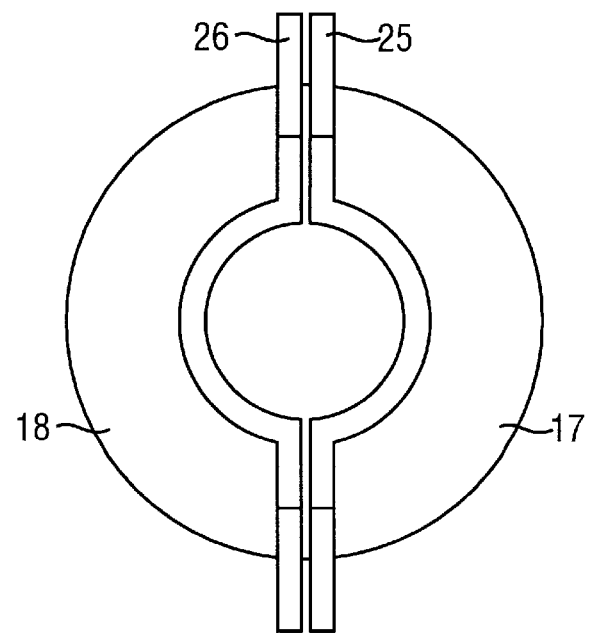
FIG. 2 is a top view of a flange protection device of the instant invention.

FIG. 1 illustrates an unprotected flange located in the splash zone of a production platform. FIGS. 2 through 5 illustrate different views of a preferred flange protection device according to the present invention. There is illustrated a first pipe 10 having an extended rim 12 on each side and connected to a second pipe 11 having an extended rim 13 on each side. A bolt 14 and a bolt 15 extend through the rims and hold the pipes together. The flange protection device, 6, encompasses the flange and that part of the pipe, 16, immediately adjacent to the flange. The flange protection device, 6, is comprised of two mirror-image, hemicylindrical sections, 17 and 18. Each hemicylindrical section is comprised of a thermoset composite and has a top neck, 19, and a bottom neck, 20, which are at opposing ends of the flange protection device. The necks substantially conform to the shape of the pipe but are a bit larger in diameter than the pipe. In this manner, if the pipe has a corrosion protection substance on it such as ArmorGard™ or RiserClad™ available from Riserclad International Inc., then the necks of the flange protection device will still be large enough in diameter to surround the pipe. The necks are in communication with the pipe (a seal may be used if necessary) to prevent ingress of air and water, as well as, egress of corrosion-inhibiting substance.

A first port, 21, is located immediately adjacent to the bottom neck, 20, of a hemicylindrical section, 18, of housing. The port is adapted such that when it is open, a corrosion-inhibiting substance may be injected into the annular space, 23. A second port, 22, is located immediately adjacent to the top neck, 19, on the mirror-image hemicylindrical section, 17, of the housing. The second port is adapted such that when it is open, any fluid which are present in the annular space, 23, prior to injection of corrosion-inhibiting substance are expelled. Upon the filling of the annular space with corrosion-inhibiting substance and the expulsion of substantially all of the prior fluids, the first port 21 and the second port 22 are closed. A valve or plug is adapted to control the opening and closing of the port.

A rubber seal, 24, is located between the two mirror-image hemicylindrical sections along the length. The seal acts to provide a cushion between the two sections and allow them to be fastened together firmly without harming the sections of housing. Rims, 25 and 26 extend the length of each section of housing in the z-plane direction, i.e., out of and into the plane of the figure. The rims are comprised of the same material as the housing and are part of each section of the housing. Five bolts, 27, extend through corresponding holes on each rim, 25 and 26, each bolt having a nut, in order to fasten the two sections of housing together such that the annular space is airtight.

The flange protection devices and methods of the instant invention allow the flanges to be protected from corrosion for extended periods of time. Surprisingly, it is contemplated that flanges may be protected from substantial corrosion for as long as 2, preferably as long as 5, more preferably as long as 10 or more years. Periodically, it may be necessary to inspect and/or repair the flanges due to regulatory or safety requirements or harsh weather such as tropical storms, heat, or cold. When such inspection or repair becomes necessary, the bolts, 27, are removed and the sections, 17 and 18, of the housing are removed to reveal the flange. It may be desirable in some instance to open port, 21, in order to drain the corrosion-inhibiting substance before removing the bolts. Depending on the corrosion-inhibiting substance, it may be desirable to separate the substance from the oxidized material, e.g., rust, which may be present in the substance. This may be done by, for example, decanting if the substance is a liquid. in this manner, the corrosion-inhibiting substance may be reused. After the inspection and/or repair has been completed, the flange protection device may be reused on the same flange or an alternate flange.

What is claimed is:

1. An apparatus suitable for protecting a flange comprising:
  (a) a corrosion-resistant housing adapted to encapsulate a flange to be protected such that an annular space between the housing and the flange is defined, said housing comprises a first section and a second section, each section comprising a top neck and a bottom neck and a laterally distended portion between the top neck and bottom neck, which are attachable such that the annular space is substantially air-tight;
  (b) a first port located on said housing and adapted for injecting a corrosion-inhibiting substance into said annular space; and (c) a second port located on said housing and adapted for expelling fluids present in the annular space.

2. The apparatus of claim 1 wherein said first and second sections of said housing are comprised of steel, thermoplastic, thermoset composite, or mixtures thereof.

3. The apparatus of claim 1 wherein said first and second sections of said housing are hemicylindrical in shape.

4. The apparatus of claim 3 wherein said first port is located adjacent to the bottom neck of the first section of said housing.

5. The apparatus of claim 3 wherein said second port is located adjacent to the top neck of the second section of said housing.

6. The apparatus of claim 1 wherein the first and second sections of said housing are attached via a bolt and nut.

7. The apparatus of claim 6 which further comprises a seal between the bolted, first and second section of said housing.

8. The apparatus of claim 1 which further comprises a corrosion-inhibiting substance in said annular space.

9. The apparatus of claim 8 wherein the corrosion-inhibiting substance is selected from citric acid, esters, or mixtures thereof.

10. An apparatus suitable for protecting a flange comprising:
   (a) a corrosion-resistant housing adapted to encapsulate a flange to be protected such that an annular space between the housing and the flange is defined, said housing comprises a first section and a second section, each section comprising a top neck and a bottom neck and a laterally distended portion between the top neck and bottom neck;
   (b) means for injecting a corrosion-inhibiting substance into said annular space and thereby expelling fluids present in the annular space prior to said injection; and
   (c) means for attaching the first and second section of said housing wherein said attaching means prevents egress of a corrosion-inhibiting substance from said annular space and ingress of fluids other than corrosion-inhibiting substance.

11. The apparatus of claim 10 wherein said first and second sections of said housing are comprised of steel, thermoplastic, thermoset composite, or mixtures thereof.

12. The apparatus of claim 10 wherein said first and second sections of said housing are hemicylindrical in shape.

13. The apparatus of claim 10 wherein said means for attaching the first and second section of said housing is a bolt and a nut.

14. The apparatus of claim 13 which further comprises a seal between the bolted, first and second section of said housing.

15. The apparatus of claim 10 which further comprises a corrosion-inhibiting substance in said annular space.

16. The apparatus of claim 10 wherein the corrosion-inhibiting substance is selected from citric acid, esters, or mixtures thereof.

17. The apparatus of claim 10 wherein said means for injecting a corrosion-inhibiting substance comprises a first port located adjacent to the bottom neck of the first section of said housing.

18. A method for protecting a flange comprising:
   (a) encapsulating a flange to be protected with a corrosion-resistant housing to form an encapsulated flange, wherein said encapsulated flange has a substantially airtight, annular space between the housing and the flange, said housing having a first port adapted for injecting a corrosion-inhibiting substance into said annular space and a second port adapted for expelling fluids present in the annular space;
   (b) injecting a corrosion-inhibiting substance into the annular space in a manner such that any fluids which were present prior to said injection are expelled, said corrosion-inhibiting substance being selected so as to be capable of being expelled from the annular space via the second port; and
   (c) maintaining the injected corrosion-inhibiting substance within said annular space.

19. The method of claim 18 wherein the corrosion-resistant housing comprises a hemicylindrical first section and a hemicylindrical second section which are comprised of steel, thermoplastic, thermoset composite, or mixtures thereof and wherein said first and second sections are attached via a bolt and nut with a seal between said first and second sections.

20. The method of claim 19 which further comprises:
   (a) detaching said first and second section from each other; and
   (b) inspecting the flange.

21. The method of claim 20 which further comprises:
   (a) re-encapsulating the flange to be protected with the corrosion-resistant housing;
   (b) injecting a corrosion-inhibiting substance into the annular space in a manner such that any fluids which were present prior to said injection are expelled; and
   (c) maintaining the injected corrosion-inhibiting substance within said annular space.

* * * * *

UNITED STATES PATENT AND TRADEMARK OFFICE
CERTIFICATE OF CORRECTION

PATENT NO. : 5,941,662
DATED : August 24, 1999
INVENTOR(S) : David J. Weaver

It is certified that error appears in the above-identified patent and that said Letters Patent is hereby corrected as shown below:

On the title page: Item [73]
    Assignee should read: -- Riserclad International, Inc.--.

In claim 16, please delete "10" in line 1 and insert - - 15 - - therefor.

Signed and Sealed this

First Day of February, 2000

Attest:

Attesting Officer

Q. TODD DICKINSON

Acting Commissioner of Patents and Trademarks